United States Patent
Sehgal et al.

(10) Patent No.: US 11,375,715 B2
(45) Date of Patent: Jul. 5, 2022

(54) LONG LASTING DISINFECTANT CLEANING COMPOSITION COMPRISING AN AMNE OXIDE/NONIONIC SURFACTANT MIXTURE

(71) Applicant: RHODIA OPERATIONS, Paris (FR)

(72) Inventors: Amit Sehgal, Potomac, MD (US); Tamara Mamistvalova, Huntingdon Valley, PA (US); Amanda Torres, Philadelphia, PA (US); Celine Burel, Philadelphia, PA (US); Kamel Ramdani, Princeton, NJ (US)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 16/789,940

(22) Filed: Feb. 13, 2020

(65) Prior Publication Data

US 2020/0253203 A1  Aug. 13, 2020

Related U.S. Application Data

(60) Provisional application No. 62/804,923, filed on Feb. 13, 2019.

(51) Int. Cl.
| | |
|---|---|
| *C11D 1/835* | (2006.01) |
| *A01N 33/12* | (2006.01) |
| *C11D 3/37* | (2006.01) |
| *C11D 11/00* | (2006.01) |
| *C11D 1/62* | (2006.01) |
| *C11D 3/00* | (2006.01) |
| *C11D 1/00* | (2006.01) |

(52) U.S. Cl.
CPC .............. *A01N 33/12* (2013.01); *C11D 1/008* (2013.01); *C11D 1/62* (2013.01); *C11D 3/0042* (2013.01); *C11D 3/37* (2013.01); *C11D 3/3773* (2013.01); *C11D 11/0023* (2013.01)

(58) Field of Classification Search
CPC ....................................................... C11D 1/62
See application file for complete search history.

(56) References Cited

U.S. PATENT DOCUMENTS

| | | | |
|---|---|---|---|
| 5,454,984 A | 10/1995 | Graubart et al. | |
| 6,569,261 B1 | 5/2003 | Aubay et al. | |
| 6,593,288 B2 | 7/2003 | Aubay et al. | |
| 6,703,358 B1 | 3/2004 | Aubay et al. | |
| 6,767,410 B2 | 7/2004 | Aubay et al. | |
| 2005/0124519 A1* | 6/2005 | Sherry | C11D 11/0023 510/238 |
| 2009/0324964 A1* | 12/2009 | Jaynes | C11D 3/3796 428/426 |
| 2012/0213759 A1* | 8/2012 | Karsten | C11D 1/62 424/94.1 |
| 2016/0262999 A1* | 9/2016 | Pedersen | A61K 8/416 |

* cited by examiner

*Primary Examiner* — Charles I Boyer
(74) *Attorney, Agent, or Firm* — Jarrod N. Raphael; Sarah Klosek (57) ABSTRACT

The present disclosure provides an antimicrobial composition that includes: an antimicrobial component having at least one quaternary ammonium compound; a synthetic polymer that includes: at least one cationic monomer $A_b$, optionally, at least one anionic monomer $B_a$, and optionally, at least one non-ionic monomer $C_a$; an organic acid; and a surfactant selected from cationic surfactants, amphoteric surfactants and combinations thereof; and at least one non-ionic surfactant selected from the group consisting of low hydrophilic-lipophilic balance (HLB) non-ionic surfactants with a delocalized electronic structure that have moderate to poor water solubility. This composition when applied to a surface demonstrates good cleaning ability and provides robust long lasting disinfection.

41 Claims, 4 Drawing Sheets

LONG LASTING DISINFECTANT CLEANING COMPOSITION COMPRISING AN AMNE OXIDE/NONIONIC SURFACTANT MIXTURE

CROSS-REFERENCE TO RELATED APPLICATION

The present application claims the benefit of priority under 35 U.S.C. § 119(e) of U.S. Provisional Application Ser. No. 62/804,923, filed on Feb. 13, 2019, the entire disclosure of which is incorporated herein by reference.

BACKGROUND

Antimicrobial compositions commercially available as disinfectants or as cleaners with disinfecting activity typically achieve bacterial or viral kill at 99.9% or greater only at the time of use. Re-contamination of the "clean" surface allows microorganisms to survive and spread through contact until it is treated again. The disinfection-cleaner market does not currently address long lasting disinfection for high contact areas including homes, public areas and healthcare environments. This has created demand with modern, health-conscious consumers who care about a clean home but do not have the time to clean and disinfect on a regular basis.

The critical technical challenge for developing a long lasting disinfectant cleaning composition is that while cleaning requires the presence of effective surfactants for soil removal, the presence of such surfactants reduces the durability or the long lasting nature of the residual film. Deterioration of the residual disinfectant film makes it extremely difficult to achieve 12 to 24 hour continuous disinfection.

Re-soiling or contamination of the surface requires additional treatments with such compositions. A need, therefore, exists for disinfectant cleaning formulations that provide high microbial kill without the need for repeated applications. However, designing compositions that meet the above requirements is a difficult task in view of unpredictable and complicated interactions between ingredients.

SUMMARY

The present disclosure provides hard surface treatment compositions that include an antimicrobial component including at least one quaternary ammonium compound; a synthetic polymer including: at least one cationic monomer $A_b$, optionally, at least one anionic monomer $B_a$, and optionally, at least one non-ionic monomer $C_a$; an organic acid; a surfactant selected from cationic surfactants, amphoteric surfactants and combinations thereof; and at least one non-ionic surfactant selected from low hydrophilic-lipophilic balance (HLB) non-ionic surfactants with a delocalized electronic structure that have moderate to poor water solubility. Also presented are methods of providing a surface with residual antimicrobial action that include the step of applying a composition of the present disclosure to the surface. The present disclosure also provides a substrate with residual antimicrobial action comprising a substrate wherein at least a portion of the substrate is coated with a composition of the present disclosure.

DETAILED DESCRIPTION

The present disclosure relates to cleaning compositions that provide continuous surface disinfection benefit for 12 to 24 hours with only one application, obviating the need for repeated decontamination. The cleaning efficacy of these compositions is provided by inclusion of low hydrophilic-lipophilic balance (HLB) non-ionic surfactants with delocalized electronic structure that have moderate to poor water solubility. Such disinfectant cleaning compositions provide a residual film that is abrasion resistant to wet and dry wipes while providing long lasting disinfection.

The present compositions achieve microorganism (e.g. bacterial, viral, or fungal) kill of at least 95% or greater, (e.g. 99.9% kill), for 12 to 24 hours obviating the need for repeated treatment. In order to substantiate 24 hour long-term sanitization claims with the United States Environmental Protection Agency (EPA), compositions are evaluated with the residual self-sanitization (RSS) method, EPA Protocol #01-1A (https://www.epa.gov/sites/production/files/2015-09/documents/cloroxpcol_final.pdf). For validating longer term disinfection, all extant test protocols emulate the maximum amount of recontamination and abrasion by touching and wiping anticipated before reapplication, typically a 24 hour period. An intermediate protocol with approximately half the level abrasion and re-soiling challenge to a surface is presented here as the "RSS-12h" test protocol.

In an embodiment, a film formed from the composition kills at least 99.9% (e.g. log 3 reduction) of microorganisms according to the residual self-sanitizing (RSS) activity test (EPA Protocol #01-1A). In an embodiment, a film formed from the composition kills at least 99.9% (e.g. log 3 reduction) of gram-positive bacteria and gram-negative bacteria according to the residual self-sanitizing (RSS) activity test (EPA Protocol #01-1A).

Long lasting disinfection claims are substantiated by the RSS test, which challenges the applied composition by subjecting it to recontamination (re-inoculation with microorganisms) and abrasion (wear cycles). An intermediate test protocol, with approximately half the number of re-inoculations and wear cycles ("RSS-12h") is used to predict disinfection that is durable up to 12 hours before reapplication of the test product. As outlined in FIG. 1, this procedure requires preparation of the test bacterial (microbial) culture over the first week (see EPA Protocol #01-1A) followed by testing in week 2.

Figure 1:
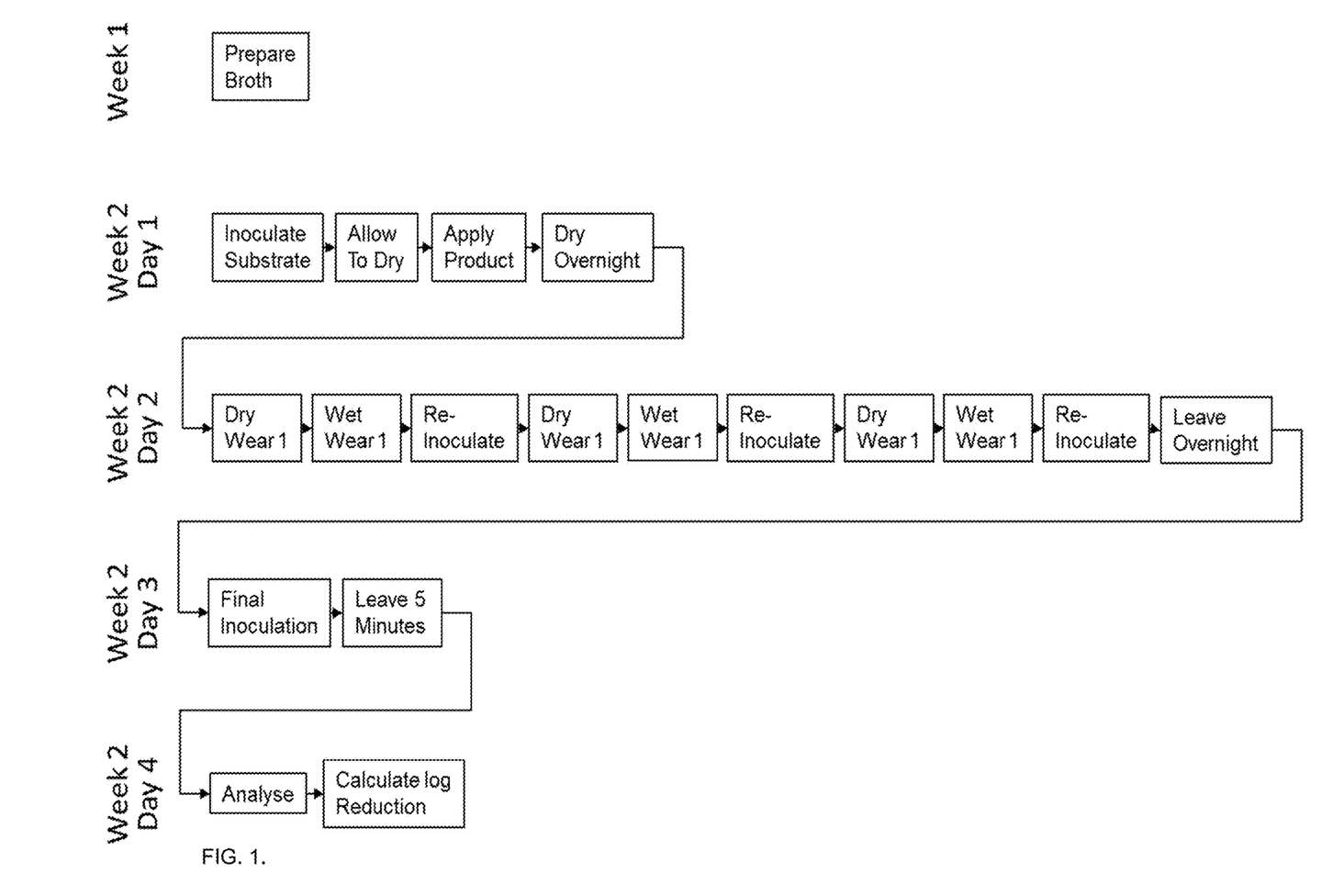
FIG. 1 is flow chart depicting the RSS-12h analysis conducted in the Examples.

The testing involves inoculating the surface with bacteria, followed by application of the product on the substrate and allowing it to dry. The substrate may be glass, polycarbonate, or steel. This substrate is then subjected to an abrasion—re-inoculation regime of 3 "wear cycles". The abrasion is conducted with a 1084 gwt. rectangular steel block covered with a cloth with an underlying thin polyurethane-foam layer. Each wear cycle is composed of a "dry" abrasion and a "wet" abrasion, the latter with the cloth cover having been wet with a mist of water using a Preval® sprayer. Each abrasion (dry/wet) is characterized by a back and forth motion of the block across the test substrate. Each abrasion cycle is followed by re-inoculation the surface with a bacterial culture. The RSS-12h involves a 3-abrasion cycle/ 3-inoculations test as compared to the full RSS test that outlines a 6-abrasion cycle/6-inoculation test regimen. All other details of the test method are as outlined in the EPA Protocol #01-1A.

The test substrate is allowed to dry overnight and then finally inoculated again (sanitizer test) for 5 minutes, followed by neutralization of the entire substrate. Surviving bacteria is then harvested off the surface and cultured with serial dilutions on agar plates, allowing colony formation over 24-48 hours. Surviving bacteria are then counted as the number of colonies. The difference in bacterial count inoculated and surviving bacteria results in an efficacy evaluation in percent kill (e.g. 99.9% kill) or log-reduction (e.g. 3-log reduction) on a logarithmic scale. The bacteria in this test may be substituted for other microorganisms such as fungi or viruses. In an embodiment, microorganisms are selected from gram-positive bacteria (e.g. *Staphylococcus aureus*), gram-negative bacteria (e.g. *Enterobacter aerogenes*), fungi, enveloped viruses, non-enveloped viruses, and combinations thereof.

The composition of the present disclosure is a liquid formulation. It is contemplated that one preferred method of making use of the composition of the present disclosure is to apply a layer of the composition to a substrate and dry the composition or allow it to dry. The act of applying a layer of the composition to a substrate and then drying it or allowing it to dry is known herein as "treating" the substrate. It is contemplated that, as the solvent evaporates, the composition will form a film on the substrate. The dried layer of the composition is known herein as "a film."

In an embodiment, the composition includes: an antimicrobial component that includes at least one quaternary ammonium compound; a synthetic polymer that includes: at least one cationic monomer $A_b$, optionally, at least one anionic monomer $B_a$, and optionally, at least one non-ionic monomer $C_a$; an organic acid; a surfactant selected from cationic surfactants, amphoteric surfactants and combinations thereof; and at least one non-ionic surfactant selected from the group consisting of low HLB non-ionic surfactants with a delocalized electronic structure that have moderate to poor water solubility. In an embodiment, the composition includes two or more (e.g. three, four, five, etc.) non-ionic surfactants selected from the group consisting of low HLB non-ionic surfactants with a delocalized electronic structure that have moderate to poor water solubility.

In an embodiment, the non-ionic surfactant(s) is/are selected from the group consisting of non-ionic surfactants with a delocalized electronic structure having an HLB value less than 9. In an embodiment, the non-ionic surfactant(s) is/are selected from the group consisting of non-ionic surfactants with a delocalized electronic structure having an HLB value less than 8. In an embodiment, the non-ionic surfactant(s) is/are selected from the group consisting of non-ionic surfactants with a delocalized electronic structure having an HLB value less than 7. In an embodiment, the non-ionic surfactants possess a combination of different HLB values. In an embodiment, the low HLB non-ionic surfactant with a delocalized electronic structure that has moderate to poor water solubility is selected from the group consisting of tristyrylphenol ethoxylates, terpene alkoxylates, alkanolamides, and combinations thereof. In an embodiment, the low HLB non-ionic surfactant with a delocalized electronic structure that has moderate to poor water solubility is selected from the group consisting of amine surfactants. In an embodiment, the non-ionic surfactant is a tristyrylphenol ethoxylate with a low degree of ethoxylation (e.g. less than eight ethylene oxide (EO) moieties).

In an embodiment, the pH of the composition ranges from about 0 to about 5.5. In another embodiment, the pH of the composition is less than 5.5. In another embodiment, the pH of the composition ranges from 2 to 4.9. In yet another embodiment, the pH of the composition ranges from 3 to 4.8. In an embodiment, the pH of the composition ranges from 0.5 to 3.

The antimicrobial compositions of the present disclosure include at least one quaternary ammonium compound. In an embodiment, the quaternary ammonium compound is an antimicrobial "quat." The term "quaternary ammonium compound" or "quat" generally refers to any composition with the following formula:

where R1-R4 are alkyl groups that may be alike or different, substituted or unsubstituted, saturated or unsaturated, branched or unbranched, and cyclic or acyclic and may contain ether, ester, or amide linkages; they may be aromatic or substituted aromatic groups. In an embodiment, groups R1, R2, R3, and R4 each have less than a C20 chain length. $X^-$ is an anionic counterion. The term "anionic counterion" includes any ion that can form a salt with quaternary ammonium. Examples of suitable counterions include halides such as chlorides, bromides, fluorides, and iodides, sulphonates, propionates, methosulphates, saccharinates, ethosulphates, hydroxides, acetates, phosphates, carbonates, bicarbonates, and nitrates. In an embodiment, the anionic counterion is chloride.

In some embodiments, quaternary ammoniums having carbon chains of less than 20 or C2-C20 are included in compositions of the present disclosure. In other embodiments, quaternary ammoniums having carbon chains of C6-C18, C12-C18, C12-C16 and C6-C10 are included in compositions of the present disclosure. Examples of quaternary ammonium compounds useful in the present disclosure include, but are not limited to, alkyl dimethyl benzyl ammonium chloride, alkyl dimethyl ethylbenzyl ammonium chloride, octyl decyl dimethyl ammonium chloride, dioctyl dimethyl ammonium chloride, and didecyl dimethyl ammonium chloride. A single quaternary ammonium or a combination of more than one quaternary ammonium may be included in compositions of the present disclosure. Further examples of quaternary ammonium compounds useful in the present disclosure include, but are not limited to, benzethonium chloride, ethylbenzyl alkonium chloride, ethyl benzethonium chloride, myristyl trimethyl ammonium chloride, methyl benzethonium chloride, cetalkonium chloride, cetrimonium bromide (CTAB), carnitine, dofanium chloride, tetraethyl ammonium bromide (TEAB), domiphen bromide, benzododecinium bromide, benzoxonium chloride, choline, denatonium, and mixtures thereof.

In some embodiments depending on the nature of the R group, the anion, and the number of quaternary nitrogen atoms present, the antimicrobial quaternary ammonium compounds may be classified into one of the following categories: monoalkyltrimethyl ammonium salts; monoalkyldimethylbenzyl ammonium salts; dialkyldimethyl ammonium salts; heteroaromatic ammonium salts; polysubstituted quaternary ammonium salts; bis-quaternary ammonium salts; and polymeric quaternary ammonium salts. Each category will be discussed herein.

Monoalkyltrimethyl ammonium salts contain one R group that is a long-chain alkyl group, and the remaining R groups are short-chain alkyl groups, such as methyl or ethyl groups. Some non-limiting examples of monoalkyltrimethyl ammonium salts include cetyltrimethylammonium bromide, commercial available under the tradenames Rhodaquat® M242C/29 and Dehyquart® A; alkyltrimethyl ammonium chloride, commercially available as Arquad® 16; alkylaryltrimethyl ammonium chloride; and cetyldimethyl ethylammonium bromide, commercially available as Ammonyx® DME.

Monoalkyldimethylbenzyl ammonium salts contain one R group that is a long-chain alkyl group, a second R group that is a benzyl radical, and the two remaining R groups are short-chain alkyl groups, such as methyl or ethyl groups. Some non-limiting examples of monoalkyldimethylbenzyl ammonium salts include alkyldimethylbenzyl ammonium chlorides, commercially available as Barquat® from Lonza Inc.; and benzethonium chloride, commercially available as Lonzagard®, from Lonza Inc. Additionally, the monoalkyldimethylbenzyl ammonium salts may be substituted. Non-limiting examples of such salts include dodecyldimethyl-3,4-dichlorobenzyl ammonium chloride. Finally, there are mixtures of alkyldimethylbenzyl and alkyldimethyl substituted benzyl (ethylbenzyl) ammonium chlorides commercially available as BTC® 2125M from Stepan Company, and Barquat® 4250 from Lonza Inc. Other examples include N,N-benzyldimethyloctylammonium chloride, N,N-benzyldimethyldecylammonium chloride, N-dodecyl-N-benzyl-N,N-dimethylammonium chloride, N-tetradecyl-N-benzyl-N,N-dimethyl ammonium chloride, N-hexadecyl-N,N-dimethyl-N-benzylammonium chloride, N,N-dimethyl N-benzyl N-octadecyl ammonium chloride.

Dialkyldimethyl ammonium salts contain two R groups that are long-chain alkyl groups, and the remaining R groups are short-chain alkyl groups, such as methyl groups. Some non-limiting examples of dialkyldimethyl ammonium salts include didecyldimethyl ammonium halides, commercially available as Bardac® 22 from Lonza Inc.; didecyl dimethyl ammonium chloride commercially available as Bardac® 2250 from Lonza Inc.; dioctyl dimethyl ammonium chloride, commercially available as Bardac® LF and Bardac® LF-80 from Lonza Inc.; and octyl decyl dimethyl ammonium chloride sold as a mixture with didecyl and dioctyl dimethyl ammonium chlorides, commercially available as Bardac® 2050 and 2080 from Lonza Inc.

Heteroaromatic ammonium salts contain one R group that is a long-chain alkyl group, and the remaining R groups are provided by some aromatic system. Accordingly, the quaternary nitrogen to which the R groups are attached is part of an aromatic system such as pyridine, quinoline, or isoquinoline. Some non-limiting examples of heteroaromatic ammonium salts include cetylpyridinium halide, commercially available as Sumquat® 6060/CPC from Zeeland Chemical Inc.; 1-[3-chloroalkyl]-3,5,7-triaza-1-azoniaadamantane, commercially available as Dowicil® 200 from The Dow Chemical Company; and alkyl-isoquinolinium bromide.

Polysubstituted quaternary ammonium salts are a monoalkyltrimethyl ammonium salt, monoalkyldimethylbenzyl ammonium salt, dialkyldimethyl ammonium salt, or heteroaromatic ammonium salt wherein the anion portion of the molecule is a large, high-molecular weight (MW) organic ion. Some non-limiting examples of polysubstituted quaternary ammonium salts include alkyldimethyl benzyl ammonium saccharinate, and dimethylethylbenzyl ammonium cyclohexyl sulfamate.

Bis-quatemary ammonium salts contain two symmetric quaternary ammonium moieties having the general formula:

where the R groups may be long or short chain alkyl, a benzyl radical or provided by an aromatic system. Z is a carbon-hydrogen chain attached to each quaternary nitrogen. Some non-limiting examples of bis-quaternary ammonium salts include 1,10-bis(2-methyl-4-aminoquinolinium chloride)-decane; and 1,6-bis[1-methyl-3-(2,2,6-trimethyl cyclohexyl)-propyldimethylammonium chloride] hexane or triclobisonium chloride.

In an embodiment, the quaternary ammonium compound is a medium to long chain alkyl R group, such as from 8 carbons to about 20 carbons, from 8 carbons to about 18 carbons, from about 10 to about 18 carbons, and from about 12 to about 16 carbons, and providing a soluble and good antimicrobial agent.

In an embodiment, the quaternary ammonium compound is a short di-alkyl chain quaternary ammonium compound having an R group, such as from 2 carbons to about 12 carbons, from 3 carbons to about 12 carbons, or from 6 carbons to about 12 carbons.

The composition may include from about 100 to about 20,000 ppm of one or more quaternary ammonium compounds. In various embodiments, the composition includes from about 500 to about 20,000 ppm; from about 500 to about 10,000 ppm; from about 100 to about 500 ppm; or from about 500 to about 5000 ppm of one or more quaternary ammonium compounds.

Polymers suitable for use in compositions of the present disclosure include synthetic polymers having: at least one cationic monomer $A_b$, optionally, at least one anionic monomer $B_a$, and optionally, at least one non-ionic monomer $C_a$. In one embodiment, the synthetic polymer includes its homopolymer, copolymer, terpolymer, block copolymer, random polymer, linear polymer, comb polymer or branched polymer.

Any combination of these types of monomers may be used. For example, suitable polymers include but are not limited to those comprising, consisting of or consisting essentially of at least one monomer of type $A_b$ and at least one monomer of type $B_a$ and polymers comprising, consisting of or consisting essentially of at least one monomer of type $A_b$ and at least one momoner of type $C_a$, and polymers comprising, consisting of or consisting essentially of at least one of each of the three types of monomer.

In an embodiment the cationic monomer $A_b$ includes an ammonium group of formula —NR3+, wherein R, which is identical or different, represents a hydrogen atom, an alkyl group comprising 1 to 10 carbon atoms, or a benzyl group, optionally carrying a hydroxyl group, and comprise an anion (counter-ion). Examples of anionic counter-ions are halides such as chloride and bromides, sulphates, hydrosulphates, alkylsulphates (for example comprising 1 to 6 carbon atoms), sulfonates, phosphates, nitrates, citrates, carbonates, bicarbonates, formates, and acetates.

Examples of cationic monomer $A_b$ include, but are not limited to:

Diallyldimethylammonium halides such as diallyldimethylammonium chloride (DADMAC) or the corresponding bromide. Alternatively, the counter ion may be sulphate, nitrate or phosphate. Similar momomer units, such as those in which one or more of the $CH_3$ groups is replaced by a $C_2$ to 12 for example a $C_{2\ to\ 6}$ alkyl group or one or more of the $CH_2$ groups is replaced by an alkyl group having from 2 to 12, for example from 2 to 6 carbon atoms may be used. In other words, other similar commercially available monomers or polymers containing such monomers may be used.

N,N,N-trimethyl-3-((2-methyl-1-oxo-2-propenyl)amino)-1-propanaminium halides, such as the chloride (MAPTAC, also known as methacrylamido(propyl)-trimethyl ammonium chloride).

Additional examples of cationic monomer $A_b$ include, but are not limited to:
1. aminoalkyl (meth)acrylates, aminoalkyl (meth)acrylamides,
2. monomers, including particularly (meth)acrylates, and (meth)acrylamides derivatives, comprising at least one secondary, tertiary or quaternary amine function, or a heterocyclic group containing a nitrogen atom, vinylamine or ethylenimine;
3. diallyldialkyl ammonium salts;
4. their mixtures, their salts, and macromonomers deriving from therefrom;
5. dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide;
6. ethylenimine, vinylamine, 2-vinylpyridine, 4-vinylpyridine;
7. trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido (also called 2-(acryloxy)ethyltrimethylammonium, TMAEAMS) chloride, trimethylammonium ethyl (meth)acrylate (also called 2-(acryloxy)ethyltrimethylammonium, TMAEAMS) methyl sulphate, trimethyl ammonium propyl (meth)acrylamido chloride, vinylbenzyl trimethyl ammonium chloride,
8. diallyldimethyl ammonium chloride,
9. monomers having the following formula A(II):

wherein $R_1$ is a hydrogen atom or a methyl or ethyl group; $R_2$, $R_3$, $R_4$, $R_5$ and $R_6$, which are identical or different, are linear or branched $C_1$-$C_6$, preferably $C_1$-$C_4$, alkyl, hydroxyalkyl or aminoalkyl groups; m is an integer from 0 to 10, for example 1; n is an integer from 1 to 6, preferably 2 to 4; Z represents a —C(O)O— or —C(O)NH— group or an oxygen atom; A represents a $(CH_2)_p$ group, p being an integer from 1 to 6, preferably from 2 to 4; B represents a linear or branched $C_2$-$C_{12}$, typically $C_3$-$C_6$, polymethylene chain optionally interrupted by one or more heteroatoms or heterogroups, in particular O or NH, and optionally substituted by one or more hydroxyl or amino groups, preferably hydroxyl groups; X, which are identical or different, represent counterions, and their mixtures, and macromonomers deriving therefrom.

Other cationic monomers include compounds of general formula A(I):

in which: $R_1$ and $R_4$, independently of each other, represent a hydrogen atom or a linear or branched $C_1$-$C_6$ alkyl group; $R_2$ and $R_3$, independently of each other, represent an alkyl, hydroxyalkyl or aminoalkyl group in which the alkyl group is a linear or branched $C_1$-$C_6$ chain, preferably a methyl group; n and m are integers between 1 and 3; X, which may be identical or different, represent counterions which are compatible with the water-soluble or water-dispersible nature of the polymer. In one embodiment, X is selected from the group of halide anions, sulfate anions, hydrogen sulfate anions, phosphate anions, nitrate anions, citrate anions, formate anions, or acetate anions.

The polymers used in the present invention may have a polyampholyte structure such that the charge and surface adsorption are determined by pH. In an embodiment, the polymer is an acrylic acid amine-functional polymer. Examples of suitable hydrophilic polymers are described in U.S. Pat. Nos. 6,569,261, 6,593,288, 6,703,358 and 6,767,410, the disclosure of these documents is incorporated herein by reference. These documents describe water-soluble or water-dispersible copolymers including, in the form of polymerized units, (1) at least one amine-functional monomer, (2) at least one hydrophilic monomer with an acidic nature and (3) optionally at least one neutral hydrophilic monomer having an ethylenic unsaturation. The copolymers include quaternized ammonium acrylamide acid copolymers.

Examples of the anionic monomer $B_a$ include, but are not limited to, acrylic acid, methacrylic acid, α-ethacrylic acid, β,β-dimethacrylic acid, methylenemalonic acid, vinylacetic acid, allylacetic acid, ethylideneacetic acid, propylideneacetic acid, crotonic acid, maleic acid, fumaric acid, itaconic acid, citraconic acid, mesaconic acid, N-methacryloylalanine, N-acryloylhydroxyglycine, sulfopropyl acrylate, sulfoethyl acrylate, sulfoethyl methacrylate, sulfoethyl methacrylate, styrenesulfonic acid, vinylsulfonic acid, vinylphosphonic acid, phosphoethyl acrylate, phosphonoethyl acrylate, phosphopropyl acrylate, phosphonopropyl acrylate, phosphoethyl methacrylate, phosphonoethyl methacrylate, phosphopropyl methacrylate and phosphonopropyl methacrylate, and the ammonium and alkali metal salts of these acids.

Examples of the non-ionic monomer $C_a$ include, but are not limited to, alkyl acrylate; 2-(Dimethylamino)ethyl methacrylate (DMAEMA), N-vinyl pyrrolidone (NVP), N-vinylimidazole, acrylamide, and methacrylamide.

An example of a polymer suitable for use in the composition of the present disclosure is a polymer comprising, consisting of or consisting essentially of DMAEMA, MAPTAC and methylacrylic acid.

Suitable polymers include those sold under the trade name Mirapol®, for example as Mirapol® Surf-SHO, Mirapol® Surf-S110, Mirapol® HSC-310, Mirapol® CP-412, Mirapol® Surf-5200 or Mirapol® Surf-S500 available from Solvay, Novecare.

Other suitable polymers include polymers comprising, consisting of or consisting essentially of DADMAC and acrylamide, such as those sold under the trade name Polyquat® 7 or PQ7 from Surfacare or under the trade name Merquat® S from Lubrizol. Other suitable polymers include polymers comprising, consisting of or consisting essentially of DADMAC and methacrylamide and/or, acrylic acid or methacrylic acid.

Polymers comprising, consisting of or consisting essentially of MAPTAC and acrylamide or methacrylamide are also suitable for use in the composition of the present disclosure. Also suitable are polymers comprising, consisting of or consisting essentially of MAPTAC and vinyl pyrrolidone, such as Polyquat® 28. Suitable polymers include those sold under the trade names Polyquart® Pro. (which is polyquat 28 plus silicone) and Polyquart® Ampo 140 from BASF.

Other suitable polymers include polymers comprising, consisting of or consisting essentially of MAPTAC and acrylic acid or methacrylic acid, such as those sold under the trade name Polyquat® Ampho, eg Polyquat® Ampho 149.

Polymers comprising, consisting of or consisting essentially of DMAEMA and vinylpyrrolidone are suitable for use in the composition of the present disclosure. An example of such a polymer is sold under the name PQ11 by BRB International.

Other suitable polymers include polymers comprising, consisting of or consisting essentially of DMAEMA and acrylamide, such as the polymer sold under the trade name Polyquat® 5.

In an embodiment, the molecular weight of the polymer ranges from about 130,000 g/mol to about 2 million g/mol.

In an embodiment, the amount of polymer in the composition ranges from about 200 ppm to about 4,000 ppm.

Compositions of the present disclosure further include one or more organic acids. In an embodiment, the organic acid is selected from citric, malic, maleic, oxalic, glutaric, succinic, lactic, glycolic, fumaric, acetic, benzoic, propionic, sorbic, tartaric, formic and mixtures of one or more such organic acids. In another embodiment, the counterion acid may be polymeric acid, such as, for example, poly(acrylic acid) or other polycarboxylic acids (e.g. maleic anhydride, methacrylic acid, etc.) or homopolymers or copolymers (e.g. methyl methacrylate, butyl acrylate, etc.) thereof, such as those in the Rhodoline® series available from Solvay. The composition may include from 500 to 7,000 ppm of one or more organic acids.

In compositions of the present disclosure, the surfactant is selected from cationic surfactants, amphoteric surfactants and combinations thereof. Cationic surfactants are surfactants that dissolve in water to result in a net cationic charge. In an embodiment, when present, the cationic surfactant is selected from cationic amine oxides, cationic betaines, propionates, amphoacetates and combinations thereof. Amine oxides, propionates, amphoacetates and betaines are cationic in the acidic pH conditions of the present disclosure. In an embodiment, the propionate is selected from cationic C8-C22 propionates and salts thereof. In another embodiment, the cationic C8-C22 propionate is selected from alkyl ampho(di)propionate, alkyl aminopropionates, alkyl amphopropionates, salts thereof, and combinations thereof. In an embodiment the cationic amphoacetate is selected from amphoacetates according to the following formula:

and diamphoacetates according to the following formula:

where R is an aliphatic group of 8 to 18 carbon atoms, and M is a cation such as sodium, potassium, ammonium, or substituted ammonium. Sodium lauroamphoacetate, sodium cocoamphoacetate, disodium lauroamphoacetate, and disodium cocoamphodiacetate are preferred in some embodiments.

In an embodiment, the betaine is selected from cationic C8-C22 betaines and salts thereof. In a further embodiment, the cationic C8-C22 betaine is selected from alkyl dimethylbetaines, alkylamidopropyl betaines, alkylampho(di)acetates, salts thereof, and combinations thereof. Where reference is made herein to "salts thereof" for cationic surfactants, these may be any suitable salts. In one embodiment the salt is a salt based on a monovalent cation, such as Na, K, or $NH_4$. In one embodiment, the salt is a salt based on an alkali metal, e.g. Na or K. The use of alternative salts, e.g. alkali earth metal salts such as Ca and Mg could also be contemplated; however the solubility of the product would need to be borne in mind when using such salts.

Amphoteric surfactants contain both a basic and an acidic hydrophilic group and an organic hydrophobic group. In an embodiment, when present, the amphoteric surfactant is selected from sultaines, taurates, and combinations thereof. In an embodiment, the composition includes a combination of one or more cationic and amphoteric surfactants.

In addition to the components described herein, the composition may also include a polar carrier solvent (e.g. water), chelating agent, fragrance, preservative, dye, corrosion inhibitor, builder, cleansing solvent and other components known to be useful in antimicrobial compositions.

The compositions according to the present disclosure include both disinfectant cleaning compositions and concentrates which only differ in the relative proportion of water to that of the other constituents. The concentrate can be used without dilution (concentrate:water 1:0) to extremely dilute dilutions (e.g., 1:10,000). In an embodiment, a range of dilution is from about 1:1 to about 1:1,000. In another embodiment, a range of dilution is from about 1:1 to about 1:500. In yet another embodiment, a range of dilution is from about 1:10 to about 1:128.

Also disclosed are methods of providing a surface with residual antimicrobial action that includes the step of applying a composition of the present disclosure to the surface.

The composition may be applied to a surface by any method, including methods conducted by hand and methods conducted by machine and combinations thereof. For example, composition may be applied by spraying (pump, aerosol, pressure, etc.), pouring, spreading, metering (for example, with a rod or bar), mopping, wiping, brushing, dipping, mechanical application, other application methods, or combination thereof.

In an embodiment, compositions of the present disclosure are suited for use in a "spray and wipe" application. In such an application, the user generally applies an effective amount of the cleaning composition using the pump and within a few moments thereafter, wipes off the treated area with a rag, towel, or sponge, usually a disposable paper towel or sponge.

Compositions of the present disclosure, whether as described herein or in a concentrate or super concentrate form, can also be applied to a hard surface by using a wet wipe. The wipe can be of a woven or non-woven nature. Fabric substrates can include non-woven or woven pouches, sponges, in the form of abrasive or non-abrasive cleaning pads. Such fabrics are known commercially in this field and are often referred to as wipes. Such substrates can be resin bonded, hydroentangled, thermally bonded, meltblown, needlepunched, or any combination of the former.

The non-woven fabrics may be a combination of wood pulp fibers and textile length synthetic fibers formed by well-known dry-form or wet-lay processes. Synthetic fibers such as rayon, nylon, orlon and polyester as well as blends thereof can be employed. The wood pulp fibers should comprise about 30 to about 60 percent by weight of the non-woven fabric, preferably about 55 to about 60 percent by weight, the remainder being synthetic fibers. The wood pulp fibers provide for absorbency, abrasion and soil retention whereas the synthetic fibers provide for substrate strength and resiliency.

The compositions of the present disclosure are absorbed onto the wipe to form a saturated wipe. The wipe can then be sealed individually in a pouch which can then be opened when needed or a multitude of wipes can be placed in a container for use on an as needed basis. The container, when closed, sufficiently sealed to prevent evaporation of any components from the compositions.

Also provided are substrates with residual antimicrobial action that include a substrate wherein at least a portion of the substrate is coated with a composition of the present disclosure. The formulation of the present disclosure may be put to use by application any substrate. Some suitable substrates include, for example, countertops, mirrors, sinks, toilets, light switches, doorknobs, walls, floors, ceilings, partitions, railings, computer screens, keyboards, instruments, etc. Suitable substrates may be found in various settings including, for example, food preparation areas, households, industrial settings, architectural settings, medical settings, sinks, toilets, etc. Substrates may be made of any material; some suitable substrate compositions include, for example, plastic (including, for example, laminates and wall coverings), Formica, metal, glass, ceramic tile, paper (such as, for example, wallpaper), fabric, finished or unfinished wood, etc.

Also provided is the use of a composition of the present disclosure to substantially reduce or control the formation of microbial colonies on or at a surface. In an embodiment, a film formed from the composition kills at least 95% of microorganisms for at least 3 abrasion cycles according to RSS-12h. In another embodiment, a film formed from the composition kills at least 95% of microorganisms according to Environmental Protection Agency (EPA) Protocol #01-1A residual self-sanitizing activity test (e.g. 6 abrasion cycles for a 24 hour claim). In another embodiment, a film formed from the composition kills at least 99.9% of microorganisms for at least 3 abrasion cycles according to RSS-12h. In yet another embodiment, a film formed from the composition kills at least 99.9% of microorganisms according to Environmental Protection Agency (EPA) Protocol #01-1A residual self-sanitizing activity test (e.g. 6 abrasion cycles for a 24 hour claim).

In an embodiment, a film formed from the composition kills at least 95% of gram-positive bacteria and gram-negative bacteria, fungi, or enveloped and non-enveloped viruses for at least 3 abrasion cycles according to RSS-12h. In another embodiment, a film formed from the composition kills at least 95% of gram-positive bacteria and gram-negative bacteria, fungi, or enveloped and non-enveloped viruses according to Environmental Protection Agency (EPA) Protocol #01-1A residual self-sanitizing activity test (e.g. 6 abrasion cycles for a 24 hour claim). In another embodiment, a film formed from the composition kills at least 99.9% of gram-positive bacteria and gram-negative bacteria, fungi, or enveloped and non-enveloped viruses for at least 3 abrasion cycles according to RSS-12h. In yet another embodiment, a film formed from the composition kills at least 99.9% of gram-positive bacteria and gram-negative bacteria, fungi, or enveloped and non-enveloped viruses according to Environmental Protection Agency (EPA) Protocol #01-1A residual self-sanitizing activity test (e.g. 6 abrasion cycles for a 24 hour claim).

While specific embodiments are discussed, the specification is illustrative only and not restrictive. Many variations of this disclosure will become apparent to those skilled in the art upon review of this specification.

Unless defined otherwise, all technical and scientific terms used herein have the same meaning as is commonly understood by one of skill in the art to which this specification pertains.

As used in the specification and claims, the singular form "a", "an" and "the" includes plural references unless the context clearly dictates otherwise.

As used herein, and unless otherwise indicated, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

The present disclosure will further be described by reference to the following examples. The following examples are merely illustrative and are not intended to be limiting.

EXAMPLES

ASTM Procedure for Cleaning

The ASTM Method for Cleaning D4488 is intended for testing the performance of products used on resilient flooring and washable walls. This method includes preparation of soil, set-up for cleaning and evaluation of performance under hard surface cleaning conditions. A straight-line washability apparatus is used to clean surface. This method is designed to be analogous to that of a surface that is soiled and then cleaned by a consumer. This test is used to test the cleaning efficacy of all types of multipurpose household cleaners.

Preparation of the Substrate: This test protocol calls for preparation of a double coated Masonite tiles with latex paint using a paint roller. This paint must be an interior acrylic flat white. The paint brand has been predetermined by the customer to be highly porous to allow absorption of the soil. The ASTM method traditionally calls for California Paints Brand that has since been discontinued. The tiles are then set to dry for 24 hours at 45° C. prior to any soil application. The next day the center test area is marked off with a pencil at about 3.5" length to show boundaries of where the soil needs to be applied with a cheesecloth.

Preparation of Cheesecloth: A cheesecloth is used to apply the soil onto the substrate. The cheesecloth should be cut to 18"×36" dimensions and then folded in half several times to finally provide with a 2.5"×2" piece that is locked into a large 2" binder clip.

Sponge Preparation: A cellulose sponge is used for the cleaning of the soil on the surface. The sponge is cut into 4 pieces to fit snug into the sponge box of the wear tester and as described below. The sponges are then thoroughly washed and squeezed to semi-dry prior to any application of product.

Preparation of Soil: A blend of 33% vegetable shortening is combined with 33% lard, 33% vegetable oil and 1% carbon black. Soil is made fresh by warming the mixture for 30 minutes at 75° C. and applied 24 hours prior to testing.

Application of Soil to Substrate: Once the blend of oils and carbon black is heated and homogenous, it can be applied to the substrate with the cheesecloth while maintaining constant heat and mixing. The cheesecloth is soaked in the heated mixture for a few minutes to allow the absorption into the cheesecloth and then applied at moderate speed for a total of six strokes in a downward motion. The application of the soil onto the substrate is applied perpendicular to the cleaning direction of the scrubbing apparatus. The cheesecloth is dipped into the heated mixture between each stroke.

Cleaning Test: 15 g of the cleaner is pipetted evenly throughout the surface of the cellulose sponge. It is then placed into a sponge box (Total weight ~350 g) and placed onto the board that is clamped into the straight-line washability apparatus. A predetermined number of cycles and speed are established to allow the sponge to go over the surface in a consistent manner usually a total of 5 cycles.

Soil Blend Ratios: Initially when the wallboard cleaning method was implemented, the soil ratios of lard, oil, shortening and carbon black differed from that of the ASTM method. The altered ratio (30% vegetable shortening; 30% lard; 30% vegetable oil; and 10% carbon black) was initially conducted due to test protocols with a greater amount of carbon black. Additional carbon black was used to visualize the difference between various products tested. This could be due to multiple factors such as particle size of the carbon black as well as its aggregation behavior with polymers in formulations.

Substrate Paint: As per ASTM Method the type of paint was specified to be an acrylic flat white interior paint by California Paints (Item 53300). An alternative flat white paint was used since the supplier no longer produces that exact version that was outlined in the test method due to the lack of scrub resistance. It was determined that a Behr Pro Dead Flat Paint would be used going forward in testing.

Supplier of Carbon Black: The ASTM method calls for use of Acros Carbonlamp, but since this exact grade has been discontinued, we experimented with different types of carbon black. We identified a grade of carbon black (Panther 405) which shows better variation of cleaning between different cleaning products.

Application of Soil: In the development stages of the cleaning protocol we were using a 50 mil (1 mil=1/1000 inch) drawdown bar. The soil was pipetted parallel to the board on the top edge and was then flow coated down with 1 stroke from the drawdown bar. We have since switched away from this form of application to be more compliant to the ASTM protocol.

Comparative Example 1—Evaluation of Current Disinfectant Cleaning Benchmarks

Figure 2:
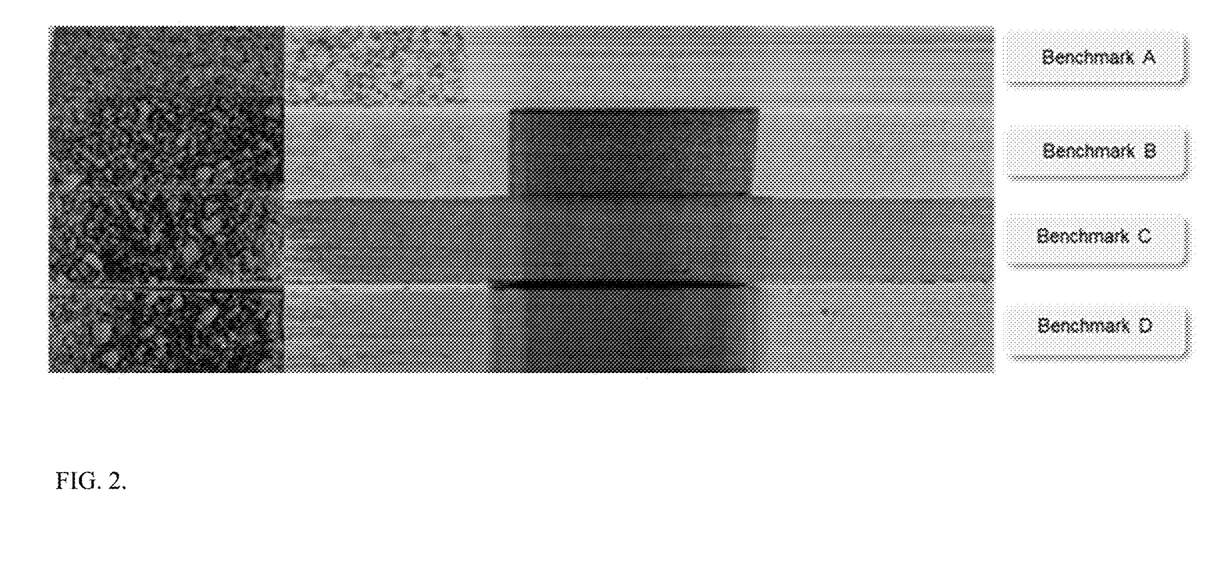
FIG. 2 provides a frame of reference for reconciling the cleaning application to desired performance.

Ready-to-use trigger spray benchmarks readily available on the market as disinfectant cleaners were tested for their cleaning performance with ASTM D4488 wallboard cleaning test. All these products claim >99.9% kill for bacteria and viruses and are efficient disinfectants. However, it is clearly apparent that Benchmark A ("quat" based all-purpose cleaner—APC) is highly effective at removing the carbonaceous greasy soil, compared to Benchmark B (bleach based APC), Benchmark C (citric acid based bathroom cleaner—BC) and "Harsh Free" Benchmark D (peroxide based APC). None of these cleaner disinfectants provide long lasting cleaning-disinfection which would require passing the RSS-12h or RSS-24h protocol. The disinfectant cleaners provide a frame of reference for reconciling the cleaning application to desired performance. (FIG. 2).

Comparative Example 2—Cleaning Efficacy of Long Lasting Disinfectant

The composition of long lasting disinfectant Formulation A is shown in Table 1. Films prepared from Formulation A were evaluated using RSS-12h protocol with *E. aerogenes* as described above, a modified version the residual self-sanitization (RSS) method, EPA Protocol #01-1A. All the films were prepared by pipetting 150 microliters of the formulation on a (1×1) inch steel substrate and allowed to air dry. Formulation A provides a robust formulation which passes RSS-12h with 4.82 LR (log reduction—greater than 3); it is a long lasting disinfectant. Formulation A has pH 4.5 with the additional lactic acid for pH control as detailed below, at which the added amine oxide is cationic giving a clear and stable solution. Formulation A is free of non-ionic surfactants.

TABLE 1

| Components (actives) | A (ppm) |
|---|---|
| Alkyldimethylbenzylammonium chloride (ADBAC) (CAS 68424-85-1) | 1960 |
| Dimethyldidecylammonium chloride (DDAC) (CAS 7173-51-5) | 7840 |
| Mirapol ® Surf-S110 | 4000 |
| Lactic acid | 810 |
| Glutamic acid diacetic acid, tetrasodium salt (GLDA) | 760 |
| Decylamine oxide (e.g. Mackamine ® C10) | 2700 |
| Water | Balance |
| Test Microorganism | *Enterobacter aerogenes* |
| Test Substrate | Steel |
| Log Reduction | 4.82 |

Figure 3:
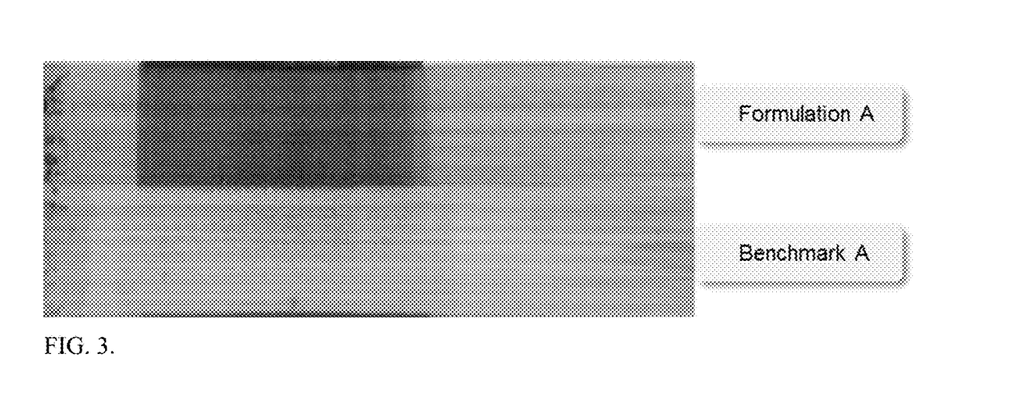
FIG. 3 shows inadequate cleaning performance of a long lasting disinfectant (Formulation A pH 4.5)

Formulation A was further evaluated for cleaning performance by ASTM D4488 as described above and compared to the best performing cleaner, Benchmark A. As can be seen in FIG. 3, Formulation A performs poorly compared to the cleaning efficacy of Benchmark A. Benchmark A removed roughly around 70% of the soil, whereas the Formulation A removed roughly 30%.

Example 3—Addition of Low HLB Tristyrylphenol Ethoxylate (TSP-xEO)

The addition of tristyrylphenol ethoxylate surfactants in Formulation A showed instant improvement in the dispersion of carbon black. The effect on cleaning performance of adding different levels of TSP-8EO to Formulation A (Table 2) while maintaining the composition at pH 4.5 was studied.

TABLE 2

| Components (Actives) | A (ppm) |
|---|---|
| Alkyldimethylbenzylammonium chloride (ADBAC) (CAS 68424-85-1) | 1960 |
| Dimethyldidecylammonium chloride (DDAC) (CAS 7173-51-5) | 7840 |
| Mirapol ® Surf-S110 | 4000 |
| Lactic acid | 810 |
| Glutamic acid diacetic acid, tetrasodium salt (GLDA) | 760 |
| Decylamine oxide (e.g.Mackamine ® C10) | 2700 |
| Tristyrylphenol ethoxylate - 8EO | 2500-10000 |

Figure 4:
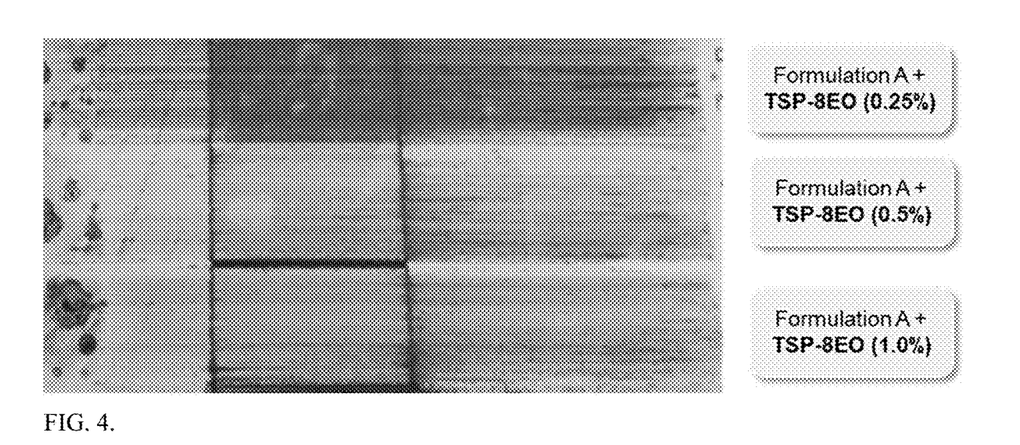
FIG. 4 shows the impact of varying amounts of TSP-8EO on cleaning performance.

The cleaning performance at different levels of added TSP-8EO is shown in FIG. 4. The addition of TSP-8EO drastically improves cleaning at levels above 0.5%.

Example 4—Impact on RSS-12h of Varying Quat Levels

Figure 5:
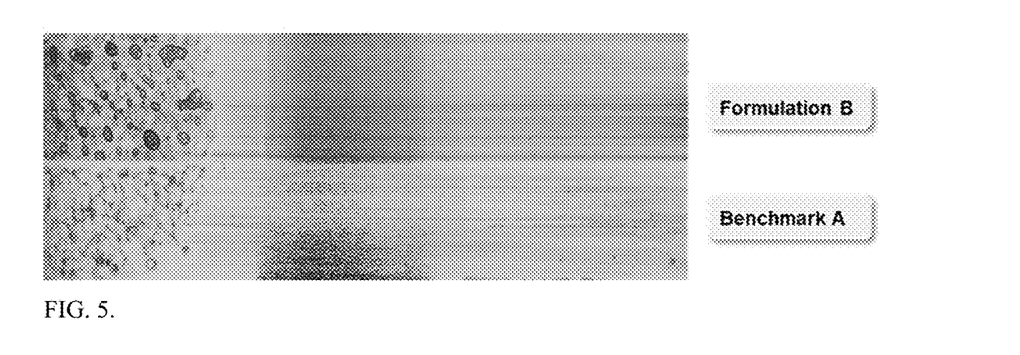
FIG. 5 shows the impact on cleaning of a formulation containing a blend of TSP-4EO and TSP-8EO as compared to Benchmark A.

Formulation B (Table 3) was prepared using Mirapol® HSC-310, adjusting the level of citric acid, and reducing the TSP-8EO. Formulation B showed very similar cleaning to Benchmark A (FIG. 5), which is one of the most effective disinfectant cleaners on the market.

TABLE 3

| Components (Actives) | B (ppm) | C (ppm) |
|---|---|---|
| Alkyldimethylbenzylammonium chloride (ADBAC) (CAS 68424-85-1) | 1960 | 1960 |
| Dimethyldidecylammonium chloride (DDAC) (CAS 7173-51-5) | 7840 | 7840 |
| Mirapol ® HSC-310 | 400 | 400 |
| Citric acid | 6720 | 6720 |
| Lactic acid | 810 | — |
| Glutamic acid diacetic acid, tetrasodium salt (GLDA) | 760 | 760 |
| Decylamine oxide (e.g. Mackamine ® C10) | 2700 | 2700 |
| Tristyrylphenol ethoxylate - 4EO | 1000 | 1000 |
| Tristyrylphenol ethoxylate - 8EO | 3500 | 3500 |
| Water | Balance | Balance |
| Test Microorganism | *Enterobacter aerogenes* | |
| Test Substrate | Steel | Steel |
| Log Reduction | TNTC | 4.55 |

Figure 6:
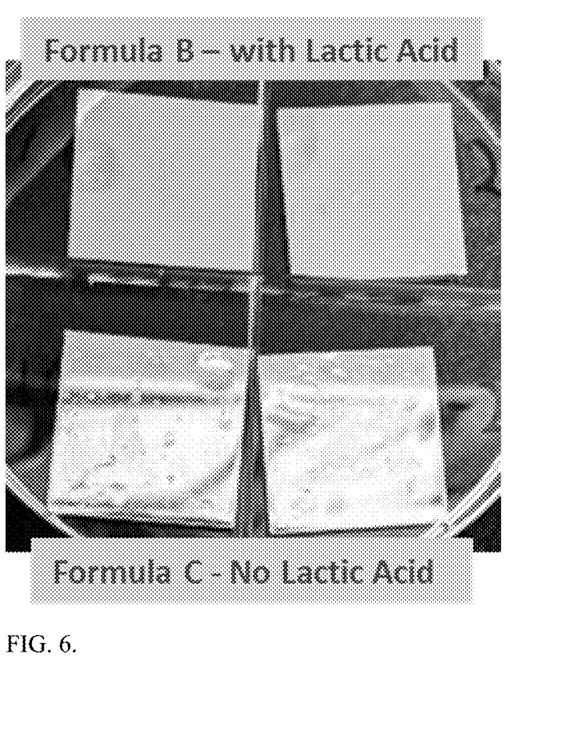
FIG. 6 demonstrates an embodiment in which substrate wetting was improved with removal of lactic acid.

The effect of minimizing acids on abrasion and RSS-12h was studied. Formulation B was further adapted to remove the lactic acid in the composition (Formulation C—Table 3) while maintaining the additional multivalent citric acid and GLDA. The removal of lactic acid from the formulation led to an interesting wetting pattern on steel tiles used for RSS-12h. Product dewetting to the corner was not observed, in contrast to what as was seen with Formulations A and B. In the absence of lactic acid, the product was more wetting on the surface (FIG. 6). This improved wetting effect is desirable when testing for abrasion resistance and RSS-12h.

Samples of the above formulations were submitted for RSS-12h. These samples included Formulations B and C with and without lactic acid. Formulation C (without lactic acid) showed 4.55 log reduction and passed RSS-12h. The achievement of greater than 3 log reduction provides a disinfectant-cleaner with a 12 hour claim for 99.9% residual kill following 3 wet and 3 dry abrasions. The cleaning efficacy was not impacted due to the removal of lactic acid (Formulation C) where even at pH 4.0 the performance was equivalent to the market leading Benchmark A while providing long lasting disinfection.

In another embodiment, reduction of quat content was studied. It is desirable to have the least amount of quats feasible to get acceptable residue feel while achieving long lasting disinfection. Formulation D is a clear stable composition at half (5000 ppm) quat as shown in Table 4.

TABLE 4

| Components (actives) | D (ppm) |
|---|---|
| Alkyldimethylbenzylammonium chloride (ADBAC) (CAS 68424-85-1) | 1000 |
| Dimethyldidecylammonium chloride (DDAC) (CAS 7173-51-5) | 4000 |
| Mirapol ® HSC-310 | 1200 |
| Citric acid | 3300 |
| Glutamic acid diacetic acid, tetrasodium salt (GLDA) | 760 |
| Decylamine oxide (e.g. Mackamine ® C10) | 2700 |
| Tristyrylphenol ethoxylate - 4EO | 1000 |
| Tristyrylphenol ethoxylate - 8EO | 2000 |
| Water | Balance |
| Test Microorganism | Enterobacter aerogenes |
| Test Substrate | Steel |
| Log Reduction | 3.99 |

Formulation D, showed 3.99 log reduction with the RSS-12h test. The achievement of greater than 3 log reduction provides a cleaner-disinfectant with a 12 hour claim for 99.9% residual kill following 3 wet and 3 dry abrasions. The cleaning efficacy was slightly reduced due to the reduced quat. However, even at pH 4.0 the performance of Formulation D was equivalent to most benchmarks (other than Benchmark A) while providing long lasting disinfection.

Example 5—RSS-24h for Disinfectant Cleaners at Varying Quat Levels

RSS-24h performance was studied using Formulations E and F (Table 5).

TABLE 5

| Components (actives) | E (ppm) | F (ppm) |
|---|---|---|
| Alkyldimethylbenzylammonium chloride (ADBAC) (CAS 68424-85-1) | 7840 | 1000 |
| Dimethyldidecylammonium chloride (DDAC) (CAS 7173-51-5) | 1960 | 4000 |
| Mirapol ® HSC-310 | 3200 | 1600 |
| Citric acid | 4803 | 3300 |
| Glutamic acid diacetic acid, tetrasodium salt (GLDA) | 760 | 760 |
| Dodecylamine oxide (e.g. Mackamine ® LA) | 2700 | 2700 |
| Tristyrylphenol ethoxylate - 4EO | 1000 | 1000 |
| Tristyrylphenol ethoxylate - 8EO | 3500 | 2000 |
| Water | Balance | Balance |
| Test Microorganism | Enterobacter aerogenes | Enterobacter aerogenes |
| Test Substrate | Steel | Steel |
| Log Reduction | 2.76 | 3.76 |

Formulation E is close to passing RSS-24h with 2.76 LR. Formulation F does succeed in passing RSS-24h with 3.76 LR. The HLB of the mixed non-ionic surfactant (TSP-4EO+TSP-8EO) for Formulation F is less than for Formulation E. The formulations also provide excellent cleaning performance.

Further improvements in RSS-24h performance can be achieved using a lower HLB non-ionic surfactant such as Tristyrylphenol ethoxylate—6.5 EO instead of a mixture of 8EO even when mixed with 4EO, as shown in Table 5.1. Both Formulation G and Formulation H pass RSS-24h with 3.95 LR and 4.18 LR, respectively, against E. aerogenes on stainless steel. Both formulations are at pH 4.5.

TABLE 5.1

| Components (actives) | G (ppm) | H (ppm) |
|---|---|---|
| Alkyldimethylbenzylammonium chloride (ADBAC) (CAS 68424-85-1) | 4000 | 2500 |
| Dimethyldidecylammonium chloride (DDAC) (CAS 7173-51-5) | 1000 | 2500 |
| Mirapol ® HSC-310 | 1200 | 1200 |
| Citric acid | 2200 | 2200 |
| Ethylenediamine tetaracetic acid, Disodium salt (EDTA-Na2) | 1500 | 1500 |
| Dodecylamine oxide (e.g. Mackamine ® LA) | 1350 | 1350 |
| Decylamine oxide (e.g. Mackamine ® C10) | 1350 | 1350 |
| Tristyrylphenol ethoxylate - 6.5EO | 4500 | 4500 |
| Water | Balance | Balance |
| Test Microorganism | Enterobacter aerogenes | Enterobacter aerogenes |
| Test Substrate | Steel | Steel |
| Log Reduction | 3.95 | 4.18 |

To further evaluate the efficacy of the formulation with respect to antimicrobial performance [ready to use (RTU) application], Formulation H liquid was tested for Virucidal Efficacy against Human Coronavirus (ATCC VR-740, Strain 229E). For Viral Efficacy test, EPA recommends the AOAC Use-Dilution Test modified for viruses or the ASTM E1053. The formulation was tested for 10 minute exposure time with an organic soil load of 5% fetal bovine serum. The recoveries were tested with WI-38 (human lung) cell line. Complete inactivation of the test virus was demonstrated. A ≥3.00 log 10 reduction in viral titer was demonstrated per volume inoculated per well and per carrier (PASSED). All test control results met acceptance criteria for a valid test.

The robust use of lower HLB non-ionic Tristyrylphenol ethoxylate was further explored by reducing the "quat" concentration to less than 3000 ppm while improving cleaning performance (Table 5.2). Reduction in "quat" concentration is desirable for improving the hazard profile of the formulation. Further improved cleaning performance is achieved by an overall increase in concentration of surfactant, while increased polymer concentration. Formulations I, J, K as outlined in Table 5.2, all pass RSS-24H and provide excellent cleaning performance.

TABLE 5.2

| Components (actives) | I (ppm) | J (ppm) | K (ppm) |
|---|---|---|---|
| Alkyldimethylbenzylammonium chloride (ADBAC) (CAS 68424-85-1) | 1450 | 600 | 2300 |
| Dimethyldidecylammonium chloride (DDAC) (CAS 7173-51-5) | 1450 | 2300 | 600 |
| Mirapol ® HSC-310 | 2400 | 2400 | 2400 |
| Citric acid | 4000 | 4000 | 4000 |
| Ethylenediamine tetaracetic acid, Disodium salt (EDTA-Na2) | 2200 | 2200 | 2200 |

TABLE 5.2-continued

| Components (actives) | I (ppm) | J (ppm) | K (ppm) |
|---|---|---|---|
| Dodecylamine oxide (e.g. Mackamine ® LA) | 4050 | 4050 | 4050 |
| Decylamine oxide (e.g. Mackamine ® C10) | 4050 | 4050 | 4050 |
| Tristyryl phenol ethoxylate - 6.5EO | 4500 | 4500 | 4500 |
| Water | Balance | Balance | Balance |
| Test Microorganism | Enterobacter aerogenes | Enterobacter aerogenes | Enterobacter aerogenes |
| Test Substrate | Steel | Steel | Steel |
| Log Reduction | 3.85 | 4.73 | 4.73 |

Performance in RSS-24h performance were also explored with variations in polymer type. The polymer Mirapol® HSC-310 above is an acrylic acid/DADMAC co-polymer (anion-cation). Table 5.3 outlines use of 3 other polymers HSC-500 (polysulfobetaine), HSC-500 VPA (polysulfobetaine vinylphosphonic acid co-polymer) & HSC-2 (ethyl ester of acrylic acid/DADMAC co-polymer). The HSC-500 (sulfobetaine) has a concurrence of a cationic and anionic moiety, while the HSC-500 VPA has additional phosphonic acid anions, and the HSC-2 has more hydrophobic non-ionic/cationic character. Another commercially available form of the HSC-500 with added citric acid is outlined in the specification as Mirapol® Surf S500. At the use levels outlined in Table 5.3, when RSS-24h was conducted with *Enterobacter aerogenes* on stainless steel, Formulation L shows 1.81 LR (98.45% kill), improving for Formulation M to 3.15 LR (99.93% kill), and for Formulation N to 4.66 LR (99.998% kill). Formulation L, M, and N have pH 5.5, 5.5, & 4.2 respectively. The "quat" (ADBAC+DDAC) level was further reduced from Formulation N (5000 ppm), to Formulation O (2900 ppm) and further to Formulation P (1000 ppm). All the Formulations N, O & P are at pH 4.2. Even at 1000 ppm "quat" (ADBAC+DDAC) level, Formulation P shows "full kill" and >4.66 LR or 99.99% kill with RSS-24h.

TABLE 5.3

| Components (actives) | L (ppm) | M (ppm) | N (ppm) | O (ppm) | P (ppm) |
|---|---|---|---|---|---|
| Alkyldimethylbenzylammonium chloride (ADBAC) (CAS 68424-85-1) | 2500 | 2500 | 2500 | 2300 | 200 |
| Dimethyldidecylammonium chloride (DDAC) (CAS 7173-51-5) | 2500 | 2500 | 2500 | 600 | 800 |
| Mirapol ® HSC-500 | 2500 | — | — | — | — |
| Mirapol ® HSC-500 VPA | — | 1300 | — | — | — |
| Mirapol ® HSC-2 | — | — | 1600 | 2400 | 2400 |
| Citric acid | 200 | 200 | 2500 | 4000 | 3200 |
| Ethylenediamine tetaracetic acid, Disodium salt (EDTA-Na2) | 1500 | 1500 | 1500 | 2200 | 1100 |
| Dodecylamine oxide (e.g. Mackamine ® LA) | 1400 | 1400 | 1400 | 4050 | 4050 |
| Decylamine oxide (e.g. Mackamine ® C10) | 3100 | 3100 | 3100 | 4050 | 4050 |
| Tristyrylphenol ethoxylate - 6.5EO | 6300 | 9400 | 5000 | 5000 | 3900 |
| Water | Balance | Balance | Balance | Balance | Balance |
| Test Microorganism | E. aero | E. aero | E. aero | E. aero | E. aero |
| Test Substrate | Steel | Steel | Steel | Steel | Steel |
| Log Reduction | 1.81 | 3.15 | 4.66 | 4.66 | 4.66 |

Example 6—Long Lasting Dilutable Concentrates

Formulations Q and R (Table 6) were diluted and tested for cleaning performance and RSS-12h with *E. aerogenes* on steel.

The cleaning performance was comparable to other dilutable concentrate benchmarks at similar dilution factors. Table 6 shows 30× dilution of Q and R (Q-30× and R-30×, respectively) and further 60× dilution of R (R-60×). 100 microliters of the diluted compositions were applied on steel substrates for RSS-12h. While Formulation Q is higher in total actives compared with Formulation R (16% w/w), the RSS-12h results show >3 LR for 30× dilutions and even for the 60× dilution of Formulation R.

TABLE 6

| Components (actives) | Q (ppm) | R (ppm) | Q-30X (ppm) | R-30X (ppm) | R-60X (ppm) |
|---|---|---|---|---|---|
| Alkyldimethylbenzylammonium chloride (ADBAC) (CAS 68424-85-1) | 21800 | 18000 | 727 | 599 | 300 |
| Dimethyldidecylammonium chloride (DDAC) (CAS 7173-51-5) | 5400 | 4500 | 180 | 148 | 74.0 |
| Mirapol ® CP-412 | 22300 | 18400 | 743 | 613 | 306.0 |
| Citric acid | 28600 | 23600 | 953 | 786 | 393.0 |
| Glutamic acid diacetic acid, tetrasodium salt (GLDA) | 6900 | 5700 | 230 | 190 | 95.0 |
| Decylamine oxide (e.g. Mackamine ® C10) | 40900 | 33700 | 1363 | 1124 | 562.0 |
| Dodecylamine oxide (e.g. Mackamine ® C12) | 40900 | 33700 | 1363 | 1124 | 562.0 |
| Tristyrylphenol ethoxylate - 6EO (TSP-6EO) | 27300 | 22500 | 910 | 750 | 375.0 |
| Water | Balance | Balance | Balance | Balance | Balance |
| Total Actives (% w/w) | 19.41 | 16.01 | 0.65 | 0.53 | 0.2667 |
| | | | 100 microliters | | |
| Test Microorganism | | | *Enterobacter aerogenes* | | |
| Test Substrate | Steel | Steel | Steel | Steel | Steel |
| Log Reduction | — | — | 4.58 | 4.28 | 4.06 |

Example 7—Improved Environmental Profile

In another embodiment, to further improve the environmental profile of the concentrates, formulations were adapted to reduce the hazardous components. These compositions are shown in Table 7 as Formulations S and T. DDAC was removed (more chronic environmental hazard) and ADBAC was used in a reduced amount (15900 ppm vs. 18000 ppm). These compositions were then further diluted 30× (S-30× and T-30×) and applied (100 microliters) on steel substrates and tested by RSS-12h protocol with *E. aerogenes*. These environmentally improved compositions pass RSS-12h with >3 LR.

TABLE 7

| Components (actives) | S (ppm) | T (ppm) | S-30X (ppm) | T-30X (ppm) |
|---|---|---|---|---|
| Alkyldimethylbenzylammonium chloride (ADBAC) (CAS 68424-85-1) | 15900 | 15900 | 530 | 530 |
| Dimethyldidecylammonium chloride (DDAC) (CAS 7173-51-5) | 0 | 0 | 0 | 0 |
| Mirapol ® CP-412 | 22484 | 22484 | 749 | 749 |
| Citric acid | 19155 | 19155 | 638 | 638 |
| Glutamic acid diacetic acid, tetrasodium salt (GLDA) | 2900 | 0 | 97 | 0 |
| Decylamine oxide (e.g. Mackamine ® C10) | 33700 | 33700 | 1123 | 1123 |
| Dodecylamine oxide (e.g. Mackamine ® C12) | 33700 | 33700 | 1123 | 1123 |
| Tristyrylphenol ethoxylate -6EO (TSP-6EO) | 22500 | 22500 | 750 | 750 |
| Water | Balance | Balance | Balance | Balance |
| Total Actives (% w/w) | 15.0339 | 14.7439 | 0.50 | 0.49 |
| | | | 100 microliters | |
| Test Microorganism | *Enterobacter aerogenes* | | | |
| Test Substrate | Steel | Steel | Steel | Steel |
| Log Reduction | — | — | 4.09 | 3.26 |

Example 8—Non-Ionic Surfactants

Figure 7:
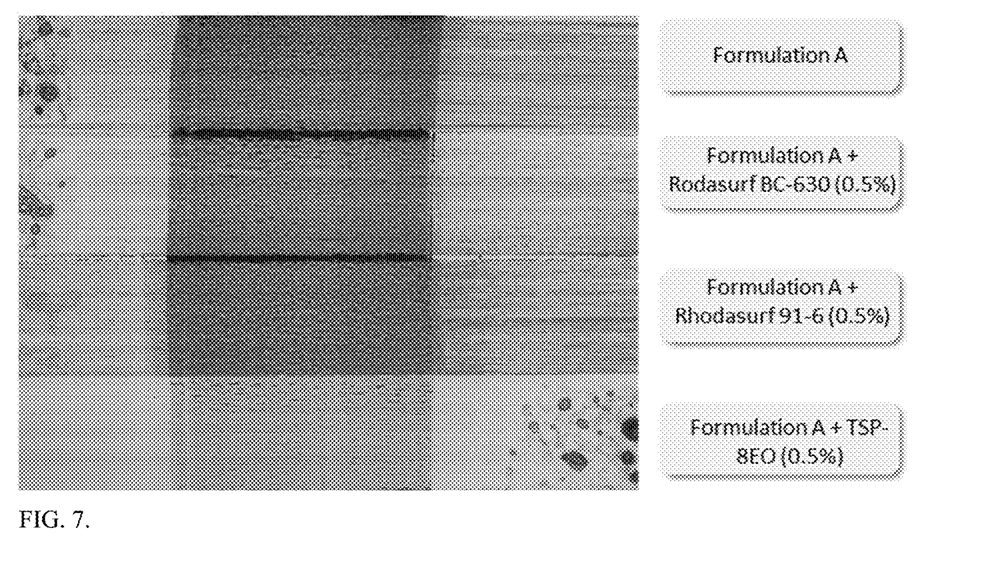
FIG. 7 shows the impact on cleaning of various non-ionic surfactants.

Three nonionic surfactants were added to Formulation A at 0.5% actives to alter cleaning performance. The addition of alcohol ethoxylates (Rhodasurf® BC-630 and Rhodasurf® 91-6) to Formulation A did not improve cleaning performance. In contrast, tristyrylphenol exthoxylate 8-EO showed a dramatic improvement in cleaning performance at the same use level (FIG. 7).

The disclosed subject matter has been described with reference to specific details of particular embodiments thereof. It is not intended that such details be regarded as limitations upon the scope of the disclosed subject matter except insofar as and to the extent that they are included in the accompanying claims.

Therefore, the exemplary embodiments described herein are well adapted to attain the ends and advantages mentioned as well as those that are inherent therein. The particular embodiments disclosed above are illustrative only, as the exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components, substances and steps. As used herein the term "consisting essentially of" shall be construed to mean including the listed components, substances or steps and such additional components, substances or steps which do not materially affect the basic and novel properties of the composition or method. In some embodiments, a composition in accordance with embodiments of the present disclosure that "consists essentially of" the recited components or substances does not include any additional components or substances that alter the basic and novel properties of the composition. If there is any conflict in the usages of a word or term in this specification and one or more patent or other documents that may be incorporated herein by reference, the definitions that are consistent with this specification should be adopted.

What is claimed is:
1. A hard surface treatment composition comprising:
 a. an antimicrobial component comprising at least one quaternary ammonium compound;
 b. a synthetic polymer comprising:
  i. at least one cationic monomer $A_b$,
  ii. optionally, at least one anionic monomer $B_a$, and
  iii. optionally, at least one non-ionic monomer $C_a$;
 c. an organic acid;
 d. at least one amine oxide surfactant; and
 e. at least one tristyrylphenol ethoxylate nonionic surfactant,
wherein a film formed from the composition kills at least 95% of microorganisms for at least 3 abrasion cycles according to RSS-12h.

2. The composition of claim 1, wherein the antimicrobial component is selected from the group consisting of monoalkyldimethylbenzyl ammonium salts, dialkyldimethyl ammonium salts, and combinations thereof.

3. The composition of claim 1, wherein the monomer $A_b$ is selected from the group consisting of diallyldimethylammonium halides.

4. The composition of claim 1, wherein the polymer comprises monomer $B_a$ selected from the group consisting of acrylic acid, methacrylic acid, and combinations thereof.

5. The composition of claim 1, wherein the polymer comprises monomer $C_a$ selected from the group consisting of 2-(dimethylamino)ethyl methacrylate (DMAEMA); N-vinyl pyrrolidone (NVP); N-vinylimidazole; acrylamide; methacrylamide; alkyl acrylate; and combinations thereof.

6. The composition of claim 1, wherein the organic acid is selected from the group consisting of citric, malic, maleic, lactic, succinic, glutaric, adipic acids and combinations thereof.

7. The composition of claim 1 further comprising a polar solvent.

8. A method of providing a surface with residual antimicrobial action that comprises the step of applying the composition of claim 1 to the surface.

9. A substrate with residual antimicrobial action comprising a substrate wherein at least a portion of the substrate is coated with the composition of claim 1.

10. A method of reducing or controlling the formation of microbial colonies on or at a surface, the method comprising applying the composition of claim 1 to the surface.

11. The method of claim 10, wherein the film formed from the composition also kills at least 95% of gram-positive bacteria and gram-negative bacteria, or enveloped and non-enveloped viruses according to a modified version of Environmental Protection Agency (EPA) Protocol #01-1A residual self-sanitizing activity test.

12. The composition of claim 3, wherein the diallyldimethylammonium halides are selected from the group consisting of diallyldimethylammonium chloride, diallyldimethylammonium bromide, and combinations thereof.

13. The composition of claim 1, wherein the polymer comprises monomer $B_a$ selected from the group consisting of acrylic acid, methacrylic acid, α-ethacrylic acid, β,β-dimethacrylic acid, methylenemalonic acid, vinylacetic acid, allylacetic acid, ethylideneacetic acid, propylideneacetic acid, crotonic acid, maleic acid, fumaric acid, itaconic acid, citraconic acid, mesaconic acid, N-methacryloylalanine, N-acryloylhydroxyglycine, sulfopropyl acrylate, sulfoethyl acrylate, sulfoethyl methacrylate, sulfoethyl methacrylate, styrenesulfonic acid, vinylsulfonic acid, vinylphosphonic acid, phosphoethyl acrylate, phosphonoethyl acrylate, phosphopropyl acrylate, phosphonopropyl acrylate, phosphoethyl methacrylate, phosphonoethyl methacrylate, phosphopropyl methacrylate and phosphonopropyl methacrylate, ammonium salts thereof, alkali metal salts thereof, and combinations thereof.

14. A wipe comprising a composition, the composition comprising:
 a. an antimicrobial component comprising at least one quaternary ammonium compound;
 b. a synthetic polymer comprising:
  i. at least one cationic monomer $A_b$,
  ii. optionally, at least one anionic monomer $B_a$, and
  iii. optionally, at least one non-ionic monomer $C_a$;
 c. an organic acid;
 d. at least one amine oxide surfactant; and
 e. at least one tristyrylphenol ethoxylate nonionic surfactant,
wherein a film formed from the composition kills at least 95% of microorganisms for at least 3 abrasion cycles according to RSS-12h.

15. An aerosol composition comprising:
 a. an antimicrobial component comprising at least one quaternary ammonium compound;
 b. a synthetic polymer comprising:
  i. at least one cationic monomer $A_b$,
  ii. optionally, at least one anionic monomer $B_a$, and
  iii. optionally, at least one non-ionic monomer $C_a$;
 c. an organic acid;
 d. at least one amine oxide surfactant; and
 e. at least one tristyrylphenol ethoxylate nonionic surfactant,
wherein a film formed from the composition kills at least 95% of microorganisms for at least 3 abrasion cycles according to RSS-12h.

16. The wipe of claim 14, wherein the antimicrobial component is selected from the group consisting of monoalkyldimethylbenzyl ammonium salts, dialkyldimethyl ammonium salts, and combinations thereof.

17. The wipe of claim 14, wherein the monomer $A_b$ is selected from the group consisting of diallyldimethylammonium halides.

18. The wipe of claim 14, wherein the polymer comprises monomer $B_a$ selected from the group consisting of acrylic acid, methacrylic acid, and combinations thereof.

19. The wipe of claim 14, wherein the polymer comprises monomer $C_a$ selected from the group consisting of 2-(dimethylamino)ethyl methacrylate (DMAEMA); N-vinyl pyrrolidone (NVP); N-vinylimidazole; acrylamide; methacrylamide; alkyl acrylate; and combinations thereof.

20. The wipe of claim 14, wherein the organic acid is selected from the group consisting of citric, malic, maleic, lactic, succinic, glutaric, adipic acids and combinations thereof.

21. The wipe of claim 14, wherein the surfactant comprises a cationic surfactant selected from the group consisting of cationic amine oxides.

22. The wipe of claim 14, wherein the surfactant comprises an amphoteric surfactant selected from the group consisting of sultaines, taurates, and combinations thereof.

23. The wipe of claim 14 further comprising a polar solvent.

24. A method of providing a surface with residual antimicrobial action that comprises the step of applying the wipe of claim 14 to the surface.

25. A method of reducing or controlling the formation of microbial colonies on or at a surface, the method comprising applying the wipe of claim 14 to the surface.

26. The method of claim 25, wherein the film formed from applying the wipe also kills at least 95% of gram-positive bacteria and gram-negative bacteria, or enveloped and non-enveloped viruses according to a modified version of Environmental Protection Agency (EPA) Protocol #01-1A residual self-sanitizing activity test.

27. The wipe of claim 17, wherein the diallyldimethylammonium halides are selected from the group consisting of diallyldimethylammonium chloride, diallyldimethylammonium bromide, and combinations thereof.

28. The wipe of claim 14, wherein the polymer comprises monomer $B_a$ selected from the group consisting of acrylic acid, methacrylic acid, α-ethacrylic acid, β,β-dimethacrylic acid, methylenemalonic acid, vinylacetic acid, allylacetic acid, ethylideneacetic acid, propylideneacetic acid, crotonic acid, maleic acid, fumaric acid, itaconic acid, citraconic acid, mesaconic acid, N-methacryloylalanine, N-acryloylhydroxyglycine, sulfopropyl acrylate, sulfoethyl acrylate, sulfoethyl methacrylate, sulfoethyl methacrylate, styrenesulfonic acid, vinylsulfonic acid, vinylphosphonic acid, phosphoethyl acrylate, phosphonoethyl acrylate, phosphopropyl acrylate, phosphonopropyl acrylate, phosphoethyl methacrylate, phosphonoethyl methacrylate, phosphopropyl methacrylate and phosphonopropyl methacrylate, ammonium salts thereof, alkali metal salts thereof, and combinations thereof.

29. The aerosol composition of claim 15, wherein the antimicrobial component is selected from the group consisting of monoalkyldimethylbenzyl ammonium salts, dialkyldimethyl ammonium salts, and combinations thereof.

30. The aerosol composition of claim 15, wherein the monomer $A_b$ is selected from the group consisting of diallyldimethylammonium halides.

31. The aerosol composition of claim 15, wherein the polymer comprises monomer $B_a$ selected from the group consisting of acrylic acid, methacrylic acid, and combinations thereof.

32. The aerosol composition of claim 15, wherein the polymer comprises monomer $C_a$ selected from the group consisting of 2-(dimethylamino)ethyl methacrylate (DMAEMA); N-vinyl pyrrolidone (NVP); N-vinylimidazole; acrylamide; methacrylamide; alkyl acrylate; and combinations thereof.

33. The aerosol composition of claim 15, wherein the organic acid is selected from the group consisting of citric, malic, maleic, lactic, succinic, glutaric, adipic acids and combinations thereof.

34. The aerosol composition of claim 15, wherein the surfactant comprises a cationic surfactant selected from the group consisting of cationic amine oxides.

35. The aerosol composition of claim 15, wherein the surfactant comprises an amphoteric surfactant selected from the group consisting of sultaines, taurates, and combinations thereof.

36. The aerosol composition of claim 15 further comprising a polar solvent.

37. A method of providing a surface with residual antimicrobial action that comprises the step of applying the aerosol composition of claim 15 to the surface.

38. A method of reducing or controlling the formation of microbial colonies on or at a surface, the method comprising applying the aerosol composition of claim 15 to the surface.

39. The method of claim 38, wherein the film formed from the aerosol composition also kills at least 95% of gram-positive bacteria and gram-negative bacteria, or enveloped and non-enveloped viruses according to a modified version of Environmental Protection Agency (EPA) Protocol #01-1A residual self-sanitizing activity test.

40. The aerosol composition of claim 30, wherein the diallyldimethylammonium halides are selected from the group consisting of diallyldimethylammonium chloride, diallyldimethylammonium bromide, and combinations thereof.

41. The aerosol composition of claim 15, wherein the polymer comprises monomer $B_a$ selected from the group consisting of acrylic acid, methacrylic acid, α-ethacrylic acid, β,β-dimethacrylic acid, methylenemalonic acid, vinylacetic acid, allylacetic acid, ethylideneacetic acid, propylideneacetic acid, crotonic acid, maleic acid, fumaric acid, itaconic acid, citraconic acid, mesaconic acid, N-methacryloylalanine, N-acryloylhydroxyglycine, sulfopropyl acrylate, sulfoethyl acrylate, sulfoethyl methacrylate, sulfoethyl methacrylate, styrenesulfonic acid, vinylsulfonic acid, vinylphosphonic acid, phosphoethyl acrylate, phosphonoethyl acrylate, phosphopropyl acrylate, phosphonopropyl acrylate, phosphoethyl methacrylate, phosphonoethyl methacrylate, phosphopropyl methacrylate and phosphonopropyl methacrylate, ammonium salts thereof, alkali metal salts thereof, and combinations thereof.

* * * * *